(12) United States Patent
Hung et al.

(10) Patent No.: US 8,456,773 B2
(45) Date of Patent: Jun. 4, 2013

(54) LENS MODULE

(75) Inventors: Kuo-Chih Hung, New Taipei (TW); Hsueh-Chin Lu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 143 days.

(21) Appl. No.: 13/079,077

(22) Filed: Apr. 4, 2011

(65) Prior Publication Data

US 2012/0105988 A1     May 3, 2012

(30) Foreign Application Priority Data

Oct. 28, 2010 (TW) ............................... 99136964 A

(51) Int. Cl.
*G02B 7/02* (2006.01)

(52) U.S. Cl.
USPC ........... 359/830; 359/703; 359/704; 359/700; 359/701; 359/822

(58) Field of Classification Search
USPC .................. 359/694, 700, 701, 72, 811–830, 359/703, 704; 396/79, 87, 451, 83
See application file for complete search history.

(56) References Cited

U.S. PATENT DOCUMENTS

| | | | | | |
|---|---|---|---|---|---|
| 4,841,323 | A | * | 6/1989 | Yamada et al. | 396/90 |
| 4,887,107 | A | * | 12/1989 | Nakamura et al. | 396/75 |
| 5,262,898 | A | * | 11/1993 | Nomura | 359/700 |
| 5,587,754 | A | * | 12/1996 | Katayama et al. | 396/144 |
| 5,731,913 | A | * | 3/1998 | Imanari | 359/700 |
| 5,912,772 | A | * | 6/1999 | Aoki | 359/701 |
| 5,926,322 | A | * | 7/1999 | Iwasaki | 359/694 |
| 6,055,116 | A | * | 4/2000 | Nomura et al. | 359/822 |
| 6,204,977 | B1 | * | 3/2001 | Iwasa | 359/700 |
| 6,324,019 | B1 | * | 11/2001 | Takanashi et al. | 359/704 |
| 6,369,956 | B1 | * | 4/2002 | Nomura et al. | 359/700 |
| 6,469,841 | B2 | * | 10/2002 | Nomura et al. | 359/699 |
| 6,611,663 | B2 | * | 8/2003 | Nakagawa | 396/62 |
| 6,665,129 | B2 | * | 12/2003 | Nomura et al. | 359/700 |
| 6,711,349 | B1 | * | 3/2004 | DiRisio | 396/72 |
| 2001/0019458 | A1 | * | 9/2001 | Nomura et al. | 359/699 |
| 2003/0081327 | A1 | * | 5/2003 | Nomura et al. | 359/700 |
| 2003/0081948 | A1 | * | 5/2003 | Nomura et al. | 396/72 |
| 2003/0156832 | A1 | * | 8/2003 | Nomura et al. | 396/72 |
| 2004/0042091 | A1 | * | 3/2004 | Nomura | 359/819 |
| 2004/0042092 | A1 | * | 3/2004 | Nomura | 359/819 |
| 2004/0042095 | A1 | * | 3/2004 | Nomura | 359/822 |
| 2004/0051981 | A1 | * | 3/2004 | Nomura | 359/822 |
| 2009/0052069 | A1 | * | 2/2009 | Kaneko et al. | 359/823 |
| 2009/0059400 | A1 | * | 3/2009 | Koyama et al. | 359/825 |

\* cited by examiner

*Primary Examiner* — James R. Greece
*Assistant Examiner* — Sharrief Broome
(74) *Attorney, Agent, or Firm* — Altis Law Group, Inc.

(57) ABSTRACT

A lens module includes a holder, a connecting loop, engaging pins, an adjustment ring, a fixing pin; and a lens unit. The holder includes a barrel having a receiving space. The barrel defines sliding slots. The adjustment ring defines guiding grooves and a stopping slot. The connecting loop is received in the receiving space, the adjustment ring is sleeved over the barrel, and each engaging pin is secured with the connecting loop, an end of each engaging pin passing through a corresponding sliding slot and into a corresponding guiding groove. The fixing pin passes through the stopping slot and fixed with the barrel, the lens unit is secured with the connecting loop, the adjustment ring is rotated relative to the holder, and the engaging pin slides along the guiding groove, to cause the lens unit to axially move without rotating relative to the holder.

15 Claims, 5 Drawing Sheets

LENS MODULE

BACKGROUND

1. Technical Field

The disclosure relates to image capture technology, and particularly to a lens module for a camera.

2. Description of Related Art

Cameras for portable electronic devices often have lens modules including a retractable lens unit with a rotatable adjustment ring. However, the central axis of the lens unit sometimes tends to deviate from the standard position, which can badly affect image quality.

Therefore, there is room for improvement within the art.

BRIEF DESCRIPTION OF THE DRAWINGS

Many aspects of the disclosure can be better understood with reference to the following drawings. The components in the various drawings are not necessarily drawn to scale, the emphasis instead being placed upon clearly illustrating the principles of the present disclosure. Moreover, in the drawings, like reference numerals designate corresponding parts throughout the diagrams.

DETAILED DESCRIPTION

Figure 1:
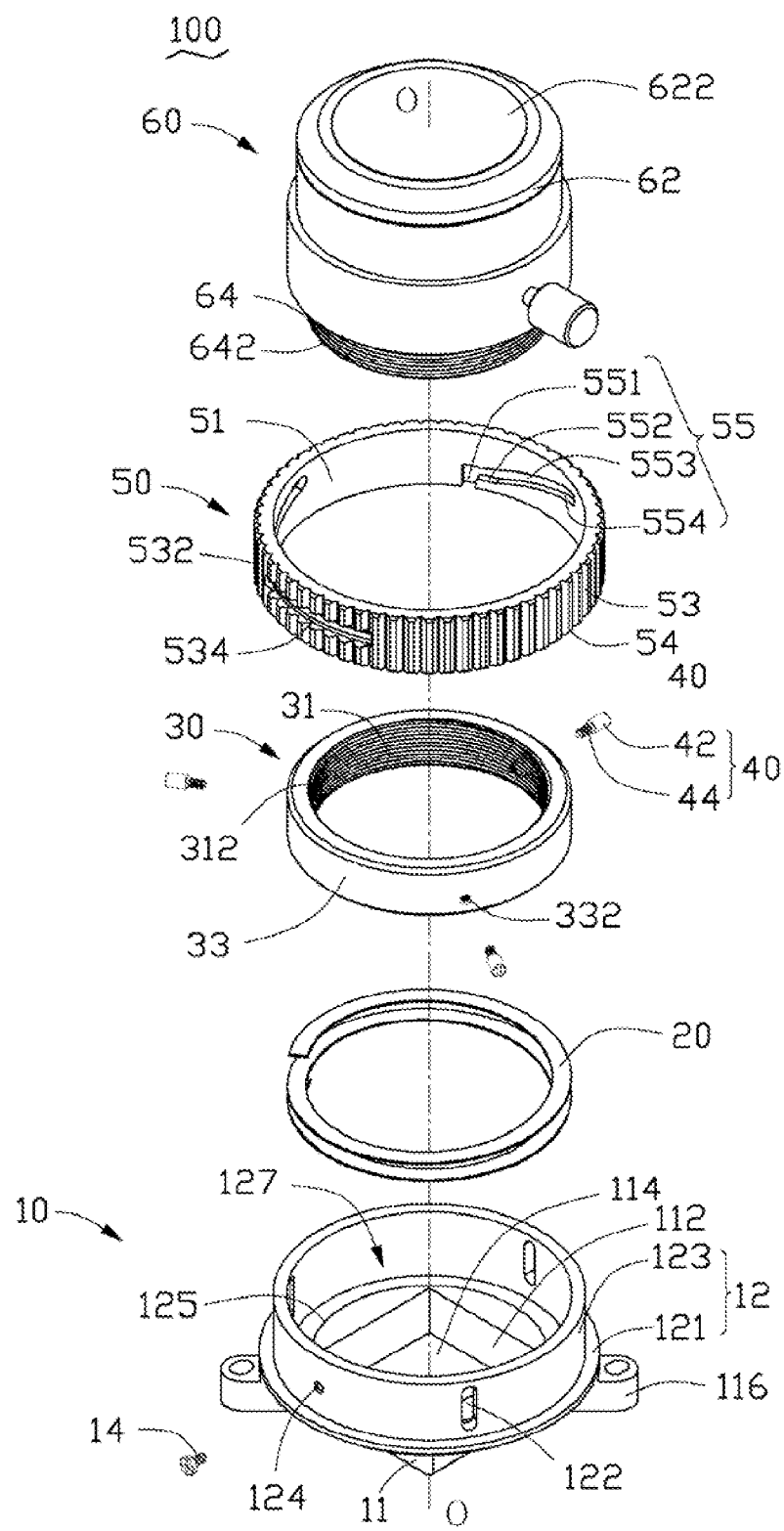
FIG. 1 is a disassembled view of a lens module as disclosed.

FIG. 1 shows a disassembled lens module 100 for a camera according to an exemplary embodiment. The lens module 100 includes a holder 10, an elastic member 20, a connecting loop 30, engaging pins 40, an adjustment ring 50, and a lens unit 60.

The holder 10 includes a bottom seat 11 and a barrel 12 fixed onto the bottom seat 11. The bottom seat 11 is a square frame and has four frame walls 112 defining a square hole 114 through which light penetrates. Two fixing footings 116 extend outwardly at opposite corners of the bottom seat 11. The barrel 12 includes a gasket portion 121 and a sleeve portion 123. The gasket portion 121 is connected at an end of the sleeve portion 123 and forms a peripheral flange 125 in the internal side of the sleeve portion 123. The gasket portion 121 is secured on the bottom seat 11. The sleeve portion 123 surrounds a receiving space 127, and the sleeve portion 123 defines a plurality of sliding slots 122 and a fixing hole 124. The sliding slots 122 are arranged along the circumference of the sleeve portion 123. Each sliding slot 122 axially extends along a direction of a central axis O-O. The fixing hole 124 is radially defined in the sleeve portion 123.

The elastic member 20 can be a compression spring. The elastic member 20 can be received in the receiving space 127.

The connecting loop 30 is annular sleeve shaped, and can be received in the receiving space 127. The connecting loop 30 has an inner peripheral surface 31 and an outer peripheral surface 33. The inner peripheral surface 31 has inner threads 312. The outer peripheral surface 33 defines connecting holes 332 for respectively corresponding to the sliding slots 122 of the barrel 12. The connecting hole 332 is used to engage with the engaging pin 40 and may be a threaded hole.

The engaging pins 40 includes a body 42 and a connecting section 44. The body 42 can slide within and extends out of the sliding slot 122. The connecting section 44 is received in the connecting hole 332 and may be threaded.

The internal diameter of the adjustment ring 50 is larger than the outer diameter of the sleeve portion 123 and therefore the adjustment ring 50 can receive the sleeve portion 123. The adjustment ring 50 has an inner peripheral surface 51, an outer peripheral surface 53, and a bottom surface 54. The inner peripheral surface 51 defines guiding grooves 55 for corresponding to the engaging pins 40. Each guiding groove 55 extends from a bottom of the adjustment ring towards a top of the adjustment ring 50 along the curved inner peripheral surface 51. The guiding groove 55 includes an access section 551, a lead section 552, a sliding section 553 inclined relative to the lead section 552 and a distal section 554, whereby the access section 551 communicates with the bottom surface 54 of the adjustment ring 50, guiding the body 42 of the engaging pin 40 to slide into the guiding groove 55. The lead section 552 and the distal section 554 are at least substantially parallel with the bottom surface 54 of the adjustment ring 50 for latching the body 42. The sliding section 553 receives the body 42 and enables the engaging pin 40 to slide. The outer peripheral surface 53 forms a plurality of strips 532 extending along the longitudinal axis O-O for gripping by the user. The outer peripheral surface 53 defines a stopping slot 534 circumferentially extending along the circumference of the adjustment ring 50 in a plane parallel with the bottom surface 54 of the adjustment ring 50. The stopping slot 534 extends through the circumference of the adjustment ring 50 to the inner peripheral surface 51.

The lens unit 60 has a top end 62 and an opposite bottom end 64. The top end 62 forms a lens cover 622, and the bottom end 64 forms external threads 642 to engage the inner threads 312 of the connecting loop 30.

Figure 2:
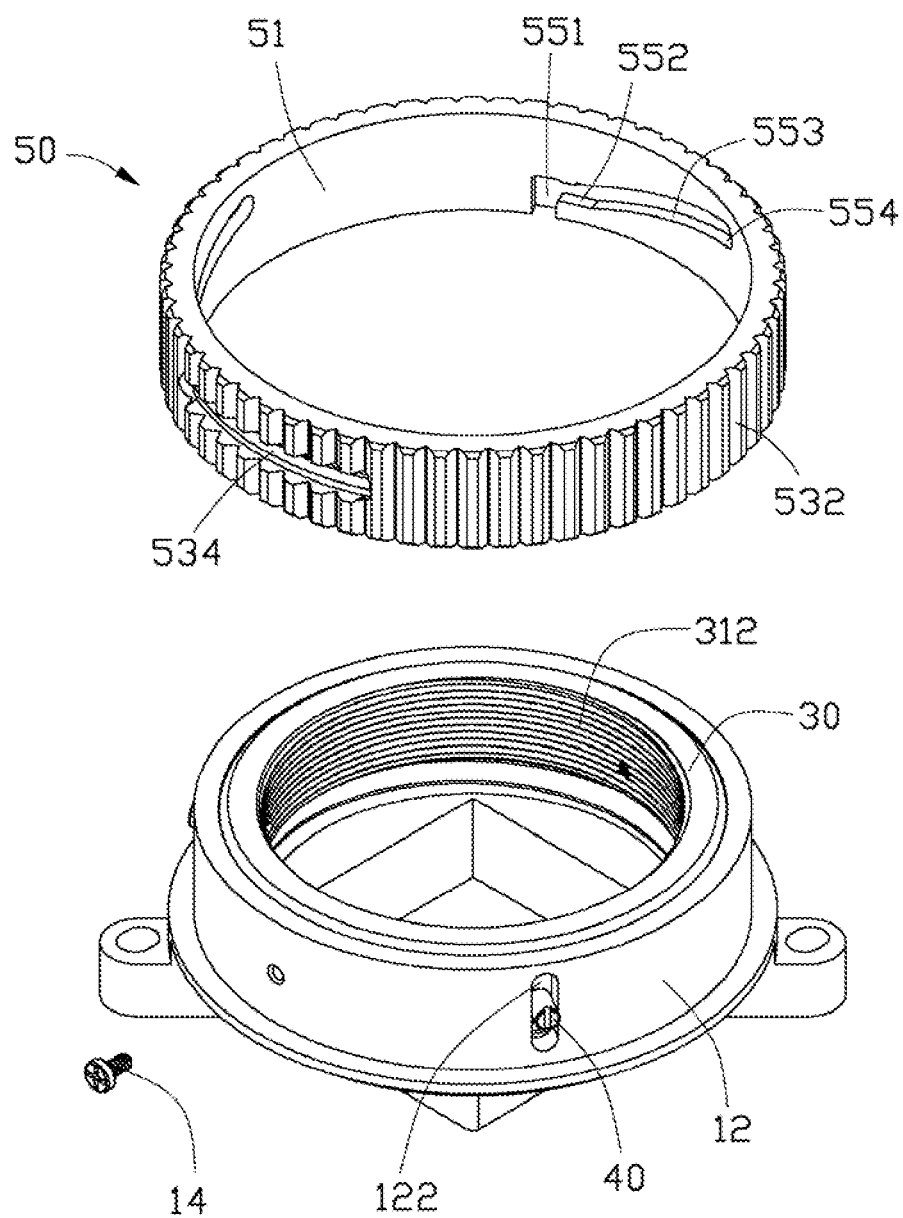
FIG. 2 is an assembly view showing partial components of the lens module of FIG. 1.
Figure 3:
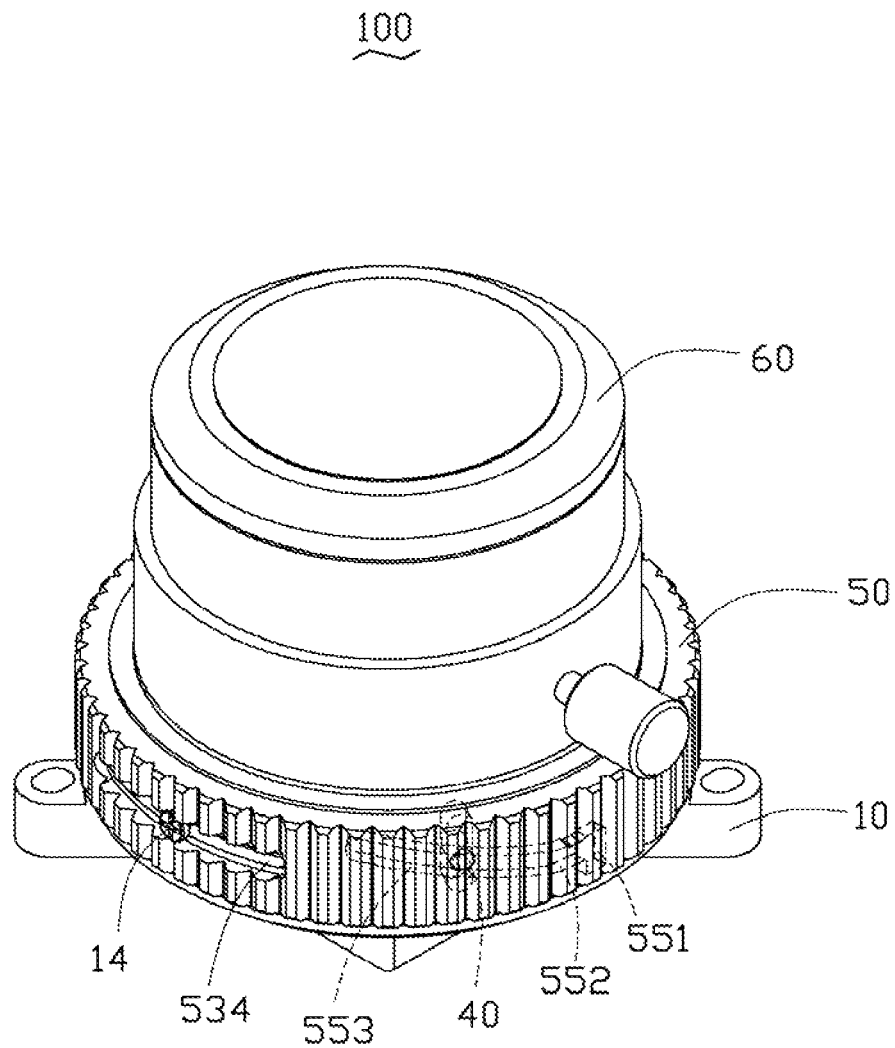
FIG. 3 is an integral view of the lens module shown in FIG. 1 after assembly.

Referring to FIGS. 2 and 3, in assembly of the lens module 100, the elastic member 20 is received in the receiving space 127 of the holder 10. The elastic member 20 attaches on the peripheral flange 125 of the gasket portion 121. The connecting loop 30 is received in the receiving space 127 and resists the elastic member 20. The sliding slots 122 align with the connecting holes 332. The connecting section 42 of each engaging pin 40 passes through the sliding slot 122 and is received in the corresponding connecting hole 332, with the body 42 of the engaging pin 40 extending outwardly from the sliding slot 122. Thus, the connecting loop 30 can only move up or down and cannot rotate relative to the barrel 12

The adjustment ring 50 is seated over the holder 10 and sleeved over the sleeve portion 123, with each body 42 received in the guiding groove 55 from the corresponding access section 551. The adjustment ring 50 then can be rotated to align the fixing hole 124 with the stopping slot 534. An end of a fixing pin 14 passes through the stopping slot 534 and into the fixing hole 124, so the adjustment ring 50 cannot move up or down relative to the barrel 12 but can rotate along the stopping slot 534. The lens unit 60 is assembled with the external threads 642 of the lens unit 60 engaging the inner threads 312 of the connecting loop 30. Thus, the lens unit 60 is secured to the connecting loop 30. Accordingly, the lens module 100 is assembled and with the fixing pin 14 is located at the middle of the stopping slot 534. The connecting section 42 is located at the middle of the sliding section 553.

Figure 4:
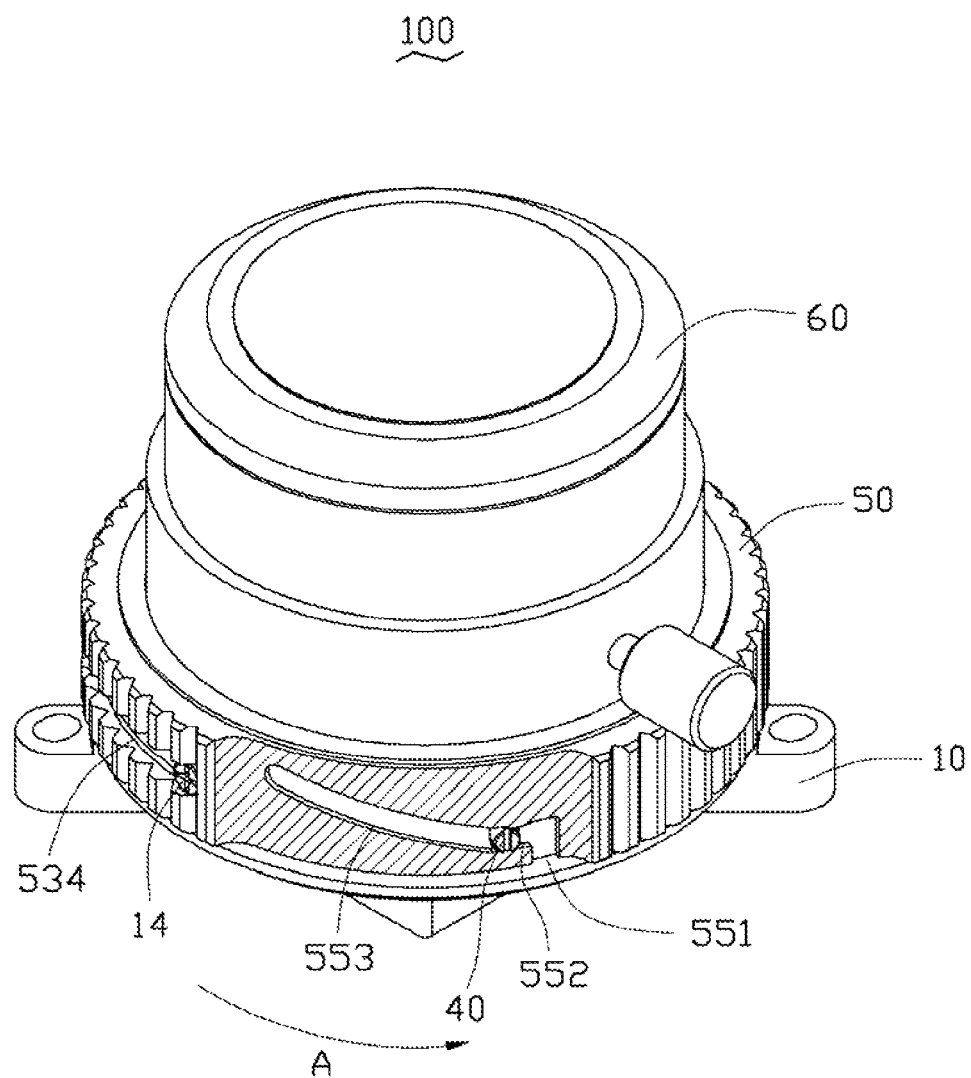
FIG. 4 shows the lens unit of the lens module collapsed.

Referring to FIG. 4, to extend the lens unit 60, the adjustment ring 50 is rotated in direction A. The fixing pin 14 rotates relative to the stopping slot 534. The adjustment ring 50 cannot move up relative to the sleeve portion 123, causing the connecting section 42 to slide to the distal section 554 of the guiding groove 55. The connecting section 42 rises toward the lens unit 60, while the connecting section 42 slides upwardly along the sliding slot 122. The connecting loop 30 and the lens unit 60 are secured integrally by the connecting section 42, so the lens unit 60 extends outwardly without rotating relative to the holder 10.

Figure 5:
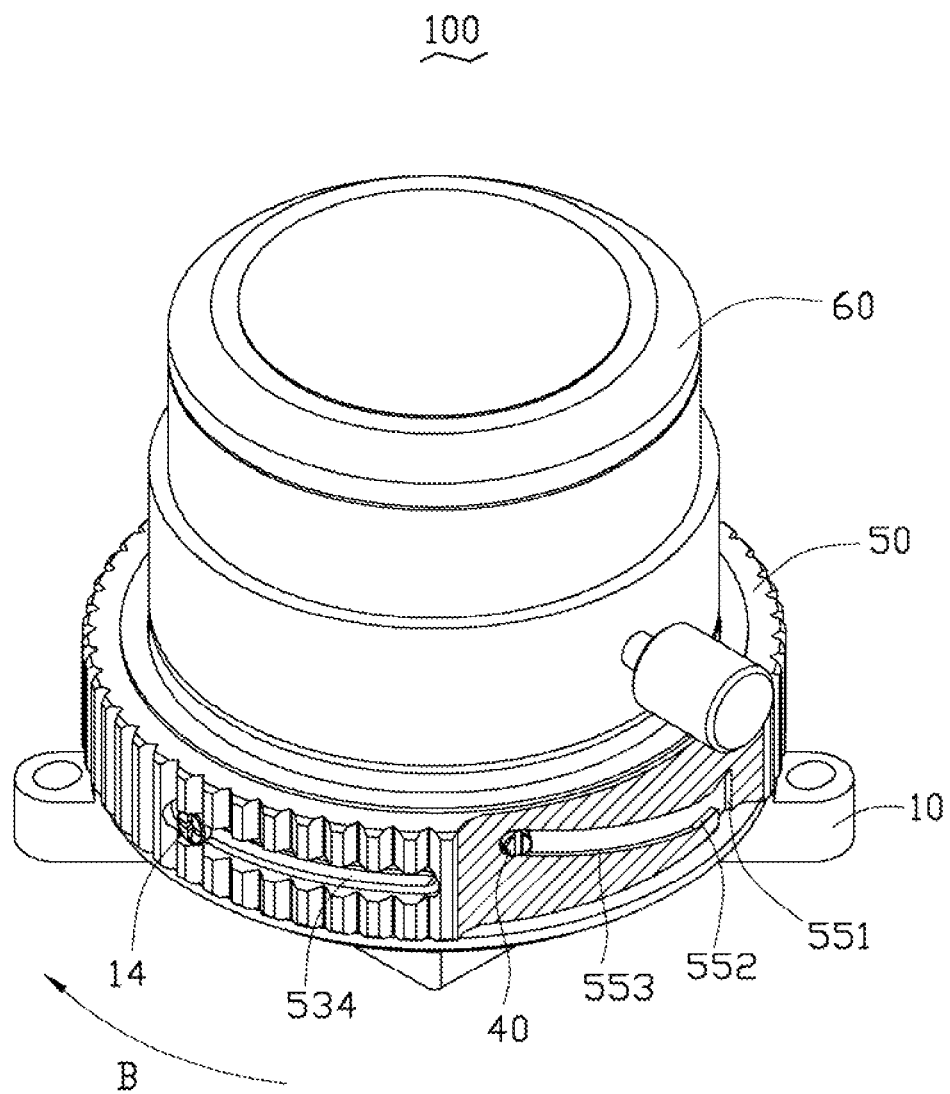
FIG. 5 shows the lens unit of the lens module extended.

Referring to FIG. 5, to retract the lens unit 60, the adjustment ring 50 is rotated along the direction B reverse to the direction A. The lens unit 60 is reversed to retract. The central axis of the lens unit 60 is maintained during rotation of the adjustment ring 50.

It is to be understood that even though numerous characteristics and advantages of the present exemplary embodiments have been set forth in the foregoing description, together with details of structures and functions of various embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A lens module, comprising:
a holder including a barrel defining a receiving space and axially extending sliding slots;
a connecting loop received in the receiving space;
an adjustment ring defining inner and outer peripheral surfaces and a bottom surface, the adjustment ring further defining guiding grooves and a stopping slot, the guiding grooves defined in the inner peripheral surface and extending from the bottom surface of the adjustment ring towards a top of the adjustment ring, the stopping slot extending along a circumference direction of the adjusting ring and communicating with the outer peripheral surface and the inner peripheral surface of the adjustment ring, the inner peripheral surface of the adjustment ring sleeved over the barrel;
engaging pins secured with the connecting loop, an end of each engaging pin passing through a corresponding sliding slot and inserted into a corresponding guiding groove;
a fixing pin passing through the stopping slot and fixed with the barrel; and
a lens unit secured with the connecting loop;
wherein when the adjustment ring is rotated relative to the barrel, the fixing pin rotates relative to the adjustment ring along the stopping slot to prevent the adjustment ring from axially moving, the engaging pins slide along the guiding grooves and the sliding slots to cause the connecting loop with the lens unit to axially move without rotating relative to the holder.

2. The lens module as claimed in claim 1, wherein the lens module includes an elastic member, the elastic member is received in the receiving space to resist the connecting loop.

3. The lens module as claimed in claim 1, wherein the barrel defines a fixing hole, the fixing pin passes through the stopping slot and is engaged in the fixing hole.

4. The lens module as claimed in claim 1, the connecting loop defines connecting holes respectively corresponding to the sliding slots, each engaging pin having a connecting section and a body, the connecting section is fixed into one of the connecting holes, the body correspondingly passes through each corresponding sliding slot into each corresponding guiding groove.

5. The lens module as claimed in claim 3, wherein the barrel includes a sleeve portion, the sleeve portion defines the sliding slots, each sliding slot axially extending along a direction of a central axis of the sleeve portion.

6. The lens module as claimed in claim 5, wherein the fixing hole is radially defined in the sleeve portion.

7. The lens module as claimed in claim 1, wherein the connecting loop has inner threads formed in an inner surface thereof, the lens unit having external threads for engaging with the inner threads of the connecting loop.

8. The lens module as claimed in claim 1, wherein the guiding grooves are defined in the inner peripheral surface of the adjustment ring.

9. The lens module as claimed in claim 8, wherein each guiding groove includes an access section, a lead section, a sliding section inclined relative to the lead section and a distal section, the access section communicates with the bottom surface of the adjustment ring, the lead section and the distal section are at least substantially parallel with the bottom surface of the adjustment ring.

10. A lens module, comprising:
a holder including a barrel defining a receiving space, sliding slots and a fixing hole;
a connecting loop defining connecting holes respectively corresponding to the sliding slots;
engaging pins respectively fixed into the connecting holes, each engaging pin having a body and a connecting section, the connecting section passing through the corresponding sliding slot, the body axially slidable but not rotatable relative to the barrel;
an adjustment ring including an inner peripheral surface and an outer peripheral surface and defining guiding grooves and a stopping slot, the adjustment ring being sleeved over the barrel, each body of the engaging pin inserted into corresponding guiding groove, the stopping slot communicating with the outer peripheral surface and the inner peripheral surface of the adjustment ring;
a fixing pin passing through the stopping slot and engage into the fixing hole to prevent the adjustment ring moving axially relative to the barrel; and
a lens unit secured with the connecting loop;
wherein when the adjustment ring is rotated relative to the holder, the fixing pin rotates relative to the adjustment ring along the stopping slot, the bodies slide along the guiding grooves and the sliding slots to cause the connecting loop with the lens unit to axially move without rotating.

11. The lens module as claimed in claim 10, wherein the lens module includes an elastic member, the elastic member is received in the receiving space to resist against the connecting loop.

12. The lens module as claimed in claim 10, wherein the holder includes a bottom seat and the barrel fixed on the bottom seat, the bottom seat is comprised of four frame walls, two fixing footings extend outwardly at opposite corners of the bottom seat.

13. The lens module as claimed in claim 12, wherein the barrel includes a gasket portion secured on the bottom seat, the gasket portion is connected to an end of the sleeve portion to forms a peripheral flange.

14. The lens module as claimed in claim 10, wherein the connecting loop further comprises an inner surface having inner threads formed thereon, the lens unit having external threads for engaging with the inner threads.

15. The lens module as claimed in claim 10, wherein the guiding grooves are defined in the inner peripheral surface without running through the outer peripheral surface, each guiding groove extends from a bottom of the adjustment ring towards a top of the adjustment ring.

* * * * *